US008325608B2

(12) United States Patent
Kumar et al.

(10) Patent No.: US 8,325,608 B2
(45) Date of Patent: Dec. 4, 2012

(54) EFFICIENT PACKET HANDLING FOR TIMER-BASED DISCARD IN A WIRELESS COMMUNICATION SYSTEM

(75) Inventors: Vanitha A. Kumar, San Diego, CA (US); Bin Qiu, San Diego, CA (US); Ashwini Raina, Poway, CA (US); Shailesh Maheshwari, San Diego, CA (US); Gang A. Xiao, San Diego, CA (US); Yateesh S. Gowda, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 12/536,587

(22) Filed: Aug. 6, 2009

(65) Prior Publication Data

US 2010/0034187 A1 Feb. 11, 2010

Related U.S. Application Data

(60) Provisional application No. 61/087,074, filed on Aug. 7, 2008.

(51) Int. Cl.
*H04W 4/00* (2009.01)
(52) U.S. Cl. .......................... 370/235; 370/328; 370/350
(58) Field of Classification Search .................. 370/229, 370/230, 230.1, 231, 232, 233, 234, 235, 370/235.1, 236, 236.1, 236.2, 310, 310.1, 370/310.2, 328, 338, 349, 350, 351, 389, 370/392, 395.4, 395.41, 395.42, 395.43, 370/395.7, 395.71, 395.72, 401, 412, 413, 370/414, 415, 416, 417, 418, 419, 420, 429, 370/463, 503, 509, 510, 511, 512, 513, 521; 455/422.1; 709/230, 231, 232, 233, 234, 709/235, 236, 238, 246, 247, 248; 710/52, 710/54, 60, 61, 65
See application file for complete search history.

(56) References Cited

U.S. PATENT DOCUMENTS

| 6,922,396 | B1 * | 7/2005 | Knappe .......................... 370/252 |
| 2005/0272432 | A1 | 12/2005 | Ji et al. |
| 2009/0103478 | A1 * | 4/2009 | Sammour et al. ............. 370/328 |

FOREIGN PATENT DOCUMENTS

EP    1519519 A1    3/2005
(Continued)

OTHER PUBLICATIONS

International Search Report and Written Opinion—PCT/US2009/053134—ISA/EPO—Nov. 9, 2009.

*Primary Examiner* — Kwang B Yao
*Assistant Examiner* — Alex Skripnikov
(74) *Attorney, Agent, or Firm* — Nerrie M. Zohn

(57) ABSTRACT

Systems and methodologies are described herein that facilitate efficient handling of packets (e.g., Packet Data Convergence Protocol (PDCP) Protocol Data Units (PDUs) or Service Data Units (SDUs)) in a wireless communication system. As described herein, a number of consecutive packets that are discarded due to a discard timer expiration event and/or other causes can be monitored and compared to a number of tolerated consecutive discarded packets. If the number of consecutive discarded packets does not exceed the number of tolerated consecutive packets, conventional processing operations such as header modification and compression, ciphering, or the like can be omitted for respective packets subsequent to a discarded packet, thereby significantly reducing processing overhead. As further described herein, the number of tolerated consecutive discarded packets can be chosen to maintain header compression (e.g., Robust Header Compression (RoHC)) synchronization, ciphering synchronization, and/or other suitable properties.

41 Claims, 12 Drawing Sheets

FOREIGN PATENT DOCUMENTS

| | | |
|---|---|---|
| JP | 11177623 A | 7/1999 |
| JP | 2003264579 A | 9/2003 |
| JP | 2006100933 A | 4/2006 |
| WO | WO2007050231 | 5/2007 |
| WO | WO2008066309 A1 | 6/2008 |

* cited by examiner

EFFICIENT PACKET HANDLING FOR TIMER-BASED DISCARD IN A WIRELESS COMMUNICATION SYSTEM

CROSS-REFERENCE

This application claims the benefit of U.S. Provisional Application Ser. No. 61/087,074, filed Aug. 7, 2008, and entitled "METHOD AND APPARATUS FOR SERVICE DATA UNIT (SDU) DISCARD PROCEDURE IN WIRELESS NETWORKS," the entirety of which is incorporated herein by reference.

BACKGROUND

I. Field

The present disclosure relates generally to wireless communications, and more specifically to techniques for packet management and processing in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

In various wireless communication implementations, information such as data, control signaling, or the like can be transmitted in the form of respective packets. Packets communicated within a wireless network can include, for example, Packet Data Convergence Protocol (PDCP) Protocol Data Units (PDUs), Service Data Units (SDUs), or the like. Further, various wireless communication devices can be configured with timer-based packet discard functionality and/or other similar functionality. In such an example, a discard timer is configured and applied to respective packets such that in the event that a given packet is not transmitted prior to expiration of the discard timer configured for the packet, the packet can be discarded in order to save over-the-air bandwidth associated with transmission of stale information.

Conventionally, upon expiration of a discard timer associated with a packet and subsequent discarding of the packet, the PDCP layer of an associated wireless communication device can be required to perform respective operations (e.g., PDCP header modification, ciphering recalculation, header compression updating, etc.) for all other packets that have been identified and queued for transmission but have not yet been transmitted. Thus, in the event that a large amount of packets are queued prior to a discard, it can be appreciated that required post-discard operations can be significantly resource-intensive, which can in turn degrade overall transmitter performance. Accordingly, it would be desirable to implement techniques for packet processing in a wireless data network that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying one or more packets to be discarded; determining whether a number of packets to be discarded will cause a number of consecutive discarded packets to become greater than a threshold number of packets; upon determining that the number of packets to be discarded will cause the number of consecutive discarded packets to become greater than the threshold number of packets, discarding the one or more packets and performing at least one packet processing operation on respective remaining identified packets; and upon determining that the number of packets to be discarded will not cause a number of consecutive discarded packets to become greater than the threshold number of packets, discarding the one or more packets without processing respective remaining identified packets.

A second aspect described herein relates to a wireless communications apparatus, which can comprise a memory that stores data relating to a Packet Data Convergence Protocol (PDCP) entity and respective packets associated with the PDCP entity, the respective packets comprising one or more designated packets to be discarded and one or more subsequent packets; and a processor configured to discard the one or more designated packets, to determine whether discarding the one or more designated packets caused a number of consecutive discarded packets to become greater than a threshold number of packets, and to perform at least one packet processing operation on respective subsequent packets upon a determination that the number of consecutive discarded packets has become greater than the threshold number of packets.

A third aspect relates to an apparatus, which can comprise means for discarding one or more packets upon expiration of an associated discard timer; means for determining whether a threshold number of discarded packets was reached upon discarding the one or more packets; and means for proceeding without re-processing respective subsequent packets upon determining that the threshold number of discarded packets was not reached upon discarding the one or more packets.

A fourth aspect described herein relates to a computer program product, which can include a computer-readable medium that comprises code for causing a computer to discard one or more PDCP Protocol Data Units (PDUs) upon expiration of an associated discard timer; code for causing a computer to determine whether a threshold number of discarded PDUs was reached upon discarding the one or more PDUs; and code for causing a computer to proceed without re-processing respective subsequent PDUs upon determining that the threshold number of discarded PDUs was not reached upon discarding the one or more PDUs.

To the accomplishment of the foregoing and related ends, one or more aspects of the claimed subject matter comprise

DETAILED DESCRIPTION

Figure 1:
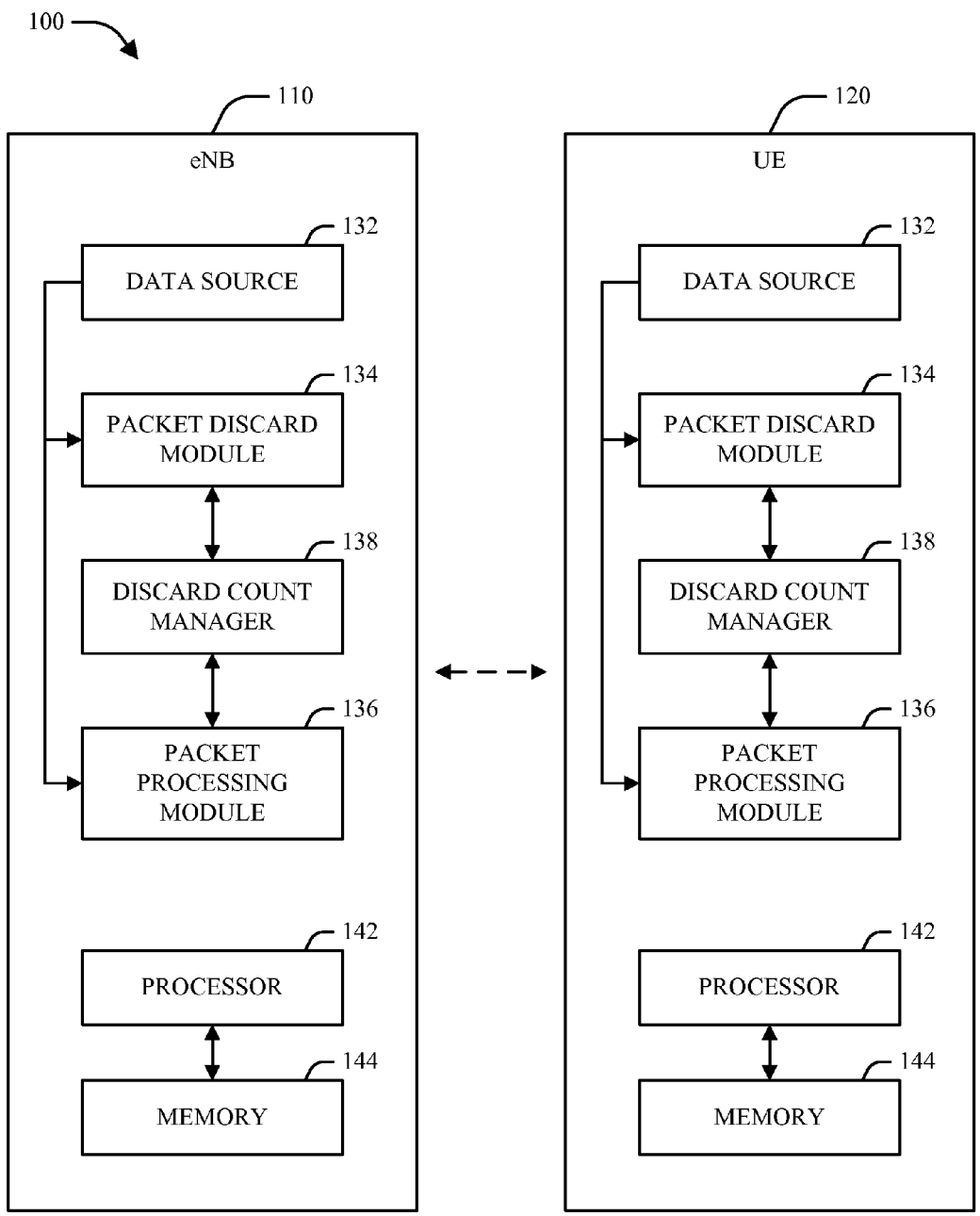
FIG. 1 is a block diagram of a system for efficient management of timer-based packet discards in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for efficient management of timer-based packet discards in a wireless communication system in accordance with various aspects described herein. As FIG. 1 illustrates, system 100 can include an Evolved Node B (eNB, also referred to herein as a base station, access point (AP), etc.) 110, which can communicate with one or more user equipment units (UEs, also referred to herein as access terminals (ATs), mobile terminals, etc.) 120. In one example, eNB 110 can engage in one or more downlink (DL, also referred to as forward link (FL)) communications with UE 120, and UE 120 can engage in one or more uplink (UL, also referred to as reverse link (RL)) communications with eNB 110. In another example, eNB 110 can be associated with a wireless communication network, such as an Evolved UMTS (Universal Mobile Telecommunications System) Terrestrial Radio Access Network (E-UTRAN), or a portion thereof (e.g., cell, sector, etc.). Further, eNB 110 can operate in conjunction with one or more other network entities, such as a system controller (not shown) or the like, for coordinating communication between eNB 110 and UE 120.

In one example, eNB 110 and UE 120 can communicate data, control signaling, and/or other information between each other and/or other entities in system 100 in the form of respective packets, such as PDCP PDUs, SDUs, or the like, which can be constructed to contain the respective information. For example, a processor 142 at eNB 110 and/or UE 120 can, either independently or with the aid of a memory 144, generate one or more packets to be transmitted within system 100. Additionally or alternatively, a memory 144 at eNB 110 and/or UE 120 can be utilized to store respective packets or corresponding information before, during, or after respective transmissions. For example, a data source 132 can be implemented wholly or in part by a processor 142 and/or memory 144 to provide various subcomponents of eNB 110 and/or UE 120 with respective packets and/or other information as generally described herein. Further, it should be appreciated that respective processors 142 and/or memories 144 can be utilized to implement all or part of the functionality described herein with respect to eNB 110, UE 120, or any subcomponents or modules thereof as set forth in the following description.

In accordance with one aspect, transmission of respective packets within system 100 can be accomplished via the use of one or more PDCP layer mechanisms as described herein and/or as generally known in the art. For example, a data source 132 can be configured to queue respective PDCP SDUs and/or other information elements at the PDCP layer for subsequent transmission via an associated transmitter (not shown) and/or processing via a packet processing module 136.

In another example, a packet discard module 134 can be implemented at eNB 110 and/or UE 120 in order to increase the overall efficiency of communication within system 100 by providing timer-based packet discard functionality for respective SDUs. More particularly, packet discard module 134 can be configured with respective discard timers corresponding to respective PDCP entities (e.g., radio bearers, communication channels, etc.) on which packet discard is configured. In one example, packet discard module 134 can independently compute respective discard timers. Additionally or alternatively, packet discard module 134 can receive information relating to respective discard timers from a local processor 142, a network controller and/or another network entity associated with system 100, and/or any other suitable source. In one example, respective discard timers can be set for a given radio bearer and/or other PDCP entity based on various factors, such as an application type associated with the PDCP entity, quality of service (QoS) or latency requirements associated with the PDCP entity and/or an application utilizing the PDCP entity, or the like.

In accordance with one aspect, upon configuration of a discard timer for a given PDCP entity, packet discard module 134 can be configured to start the discard timer for respective PDCP SDUs and/or other packets that are queued for transmission on the corresponding PDCP entity. Subsequently, if the discard timer associated with a PDCP entity expires prior to transmission of a SDU for which the discard timer was started, the SDU can be regarded as stale and discarded by packet discard module 134 in order to save the over-the-air bandwidth associated with transmission of the stale SDU. Similarly, if it is determined that a PDCP PDU corresponding to the discarded SDU has already been submitted to one or more lower layers (e.g., Radio Link Control (RLC)) associated with packet processing module 136 and/or any other suitable components of eNB 110 and/or UE 120, the discard can be indicated to the appropriate lower layers.

Figure 2:
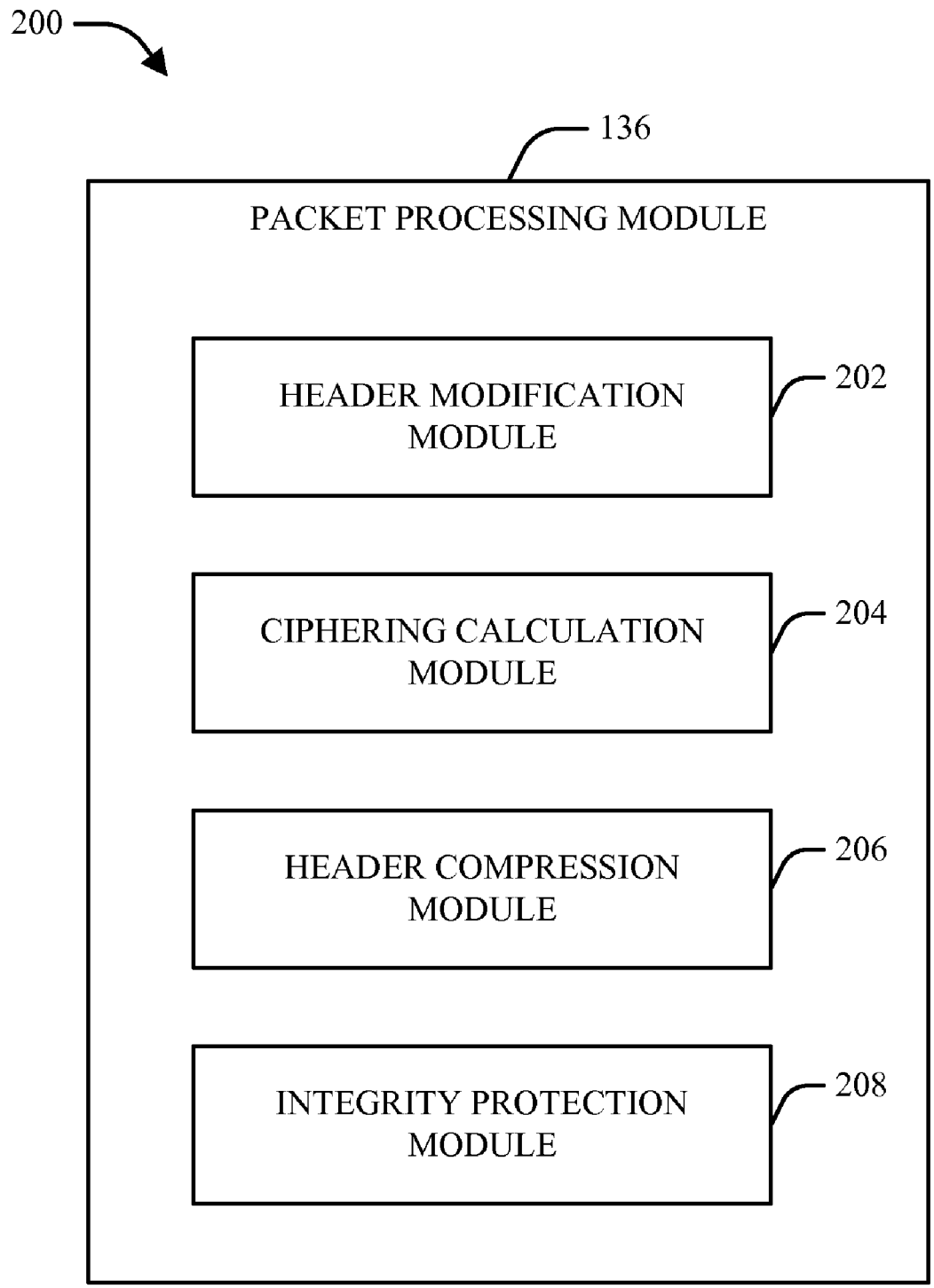
FIG. 2 is a block diagram of a system that facilitates post-discard processing of respective queued packets.

In accordance with another aspect, after discarding a PDCP SDU, packet processing module 136 can be configured to perform one or more processing operations on respective PDCP PDUs that are queued for transmission on the PDCP entity for which the SDU discard timer expired but have not yet been transmitted (e.g., PDUs associated with a PDCP-RLC watermark stage). For example, as shown in diagram 200 in FIG. 2, packet processing module 136 can perform various processing operations on respective PDUs queued for transmission via a PDCP entity on which a SDU discard has occurred. These operations can include re-working of PDCP headers associated with respective PDUs (e.g., via a header modification module 202), re-calculation of ciphering parameters (e.g., via a ciphering calculation module 204), performance of updated header compression associated with respective PDUs (e.g., via a header compression module 206), performance of updated integrity protection procedures (e.g., via an integrity protection module 208), and/or any other suitable operation(s).

By way of further specific example, operation of modules 202-208 can proceed as follows. With regard to header modification module 202, it can be appreciated that respective PDUs can be configured to include respective PDCP headers upon their initial construction. For example, it can be appreciated that PDUs can be transmitted to an intended receiver according to a pre-configured sequence. This sequence can be indicated within respective PDUs by, for example, including successive PDCP sequence numbers (SNs) within PDCP headers corresponding to successive PDUs in the sequence. However, it can further be appreciated that discarding of a PDU and/or a SDU corresponding to a PDU causes the PDCP sequence that included the discarded PDU to be broken. Accordingly, header modification module 202 can be utilized to re-sequence respective PDUs that follow a discarded PDU in order to maintain continuity of the PDCP sequence throughout the PDUs.

In another example, ciphering calculation module 204 can facilitate re-calculation of respective ciphering parameters (e.g., COUNT-C) that correspond to respective PDUs that follow a discarded PDU. By way of further example, various ciphering parameters can be pre-calculated for a given packet based on a PDCP SN and/or other parameters associated with the packet. Therefore, in the event that a packet is discarded and subsequent packets are re-sequenced by header modification module 202 and/or any other suitable means, ciphering parameters associated with the subsequent packets based on previously assigned SNs can be rendered invalid in some cases. As a result, calculation module 204 can be utilized to re-calculate ciphering parameters respectively associated with the subsequent packets based on the modified PDCP sequence associated with the packets.

Similarly, in the event that respective packets are configured for compression, header compression module 206 can be utilized to perform robust header compression (RoHC) and/or other compression techniques on respective packets as a function of the sequence of the respective packets. Accordingly, in the event that PDCP SNs associated with a set of packets are altered by header modification module 202 due to a packet discard, header compression operation(s) performed on respective packets prior to modification of the PDCP SNs can be rendered invalid in some cases, thereby necessitating the use of header compression module 206 to repeat compression for the respective packets as a function of their respective new SNs.

In a further example, integrity protection module 208 can optionally be employed to repeat one or more integrity protection operations for a set of PDUs designated for transmission on a radio bearer for which a SDU has been discarded. Integrity protection module 208 can be utilized in connection with, for example, a signaling radio bearer (SRB) and/or any other radio bearer that requires authentication.

Returning to FIG. 1, it can be appreciated that in the event that a large number of PDUs have been queued by the PDCP layer of eNB 110 and/or UE 120 for transmission (e.g., by the RLC layer), respective operations performed by packet processing module 136 can be significantly resource intensive. Further, in the event that RoHC, ciphering, and/or other operations are performed via software, such operations can cause significant loading on an associated processor 142 and/or otherwise incur significant computational and/or processing costs on eNB 110 and/or UE 120. In one example, this excessive loading and resource use can result in degradation of overall transmitter performance.

Thus, to mitigate the performance degradation described above, eNB 110 and/or UE 120 can implement a discard count manager 138 to coordinate discarding and processing of respective packets queued for transmission. In accordance with one aspect, discard count manager 138 can leverage the robustness of header compression, ciphering, and/or other operations performed with respect to a packet queue to enable eNB 110 and/or UE 120 to omit packet processing as performed by packet processing module 136 for at least a portion of packet discards. More particularly, discard count manager 138 can facilitate the omission of respective processing steps performed by packet processing module 136 as described above with regard to modules 202-208 in FIG. 2, thereby reducing the overall complexity of eNB 110 and/or UE 120 as well as the amount of processor-intensive operations required by eNB 110 and/or UE 120 in the event that a SDU discard timer expires on a given PDCP SDU.

Figure 3:
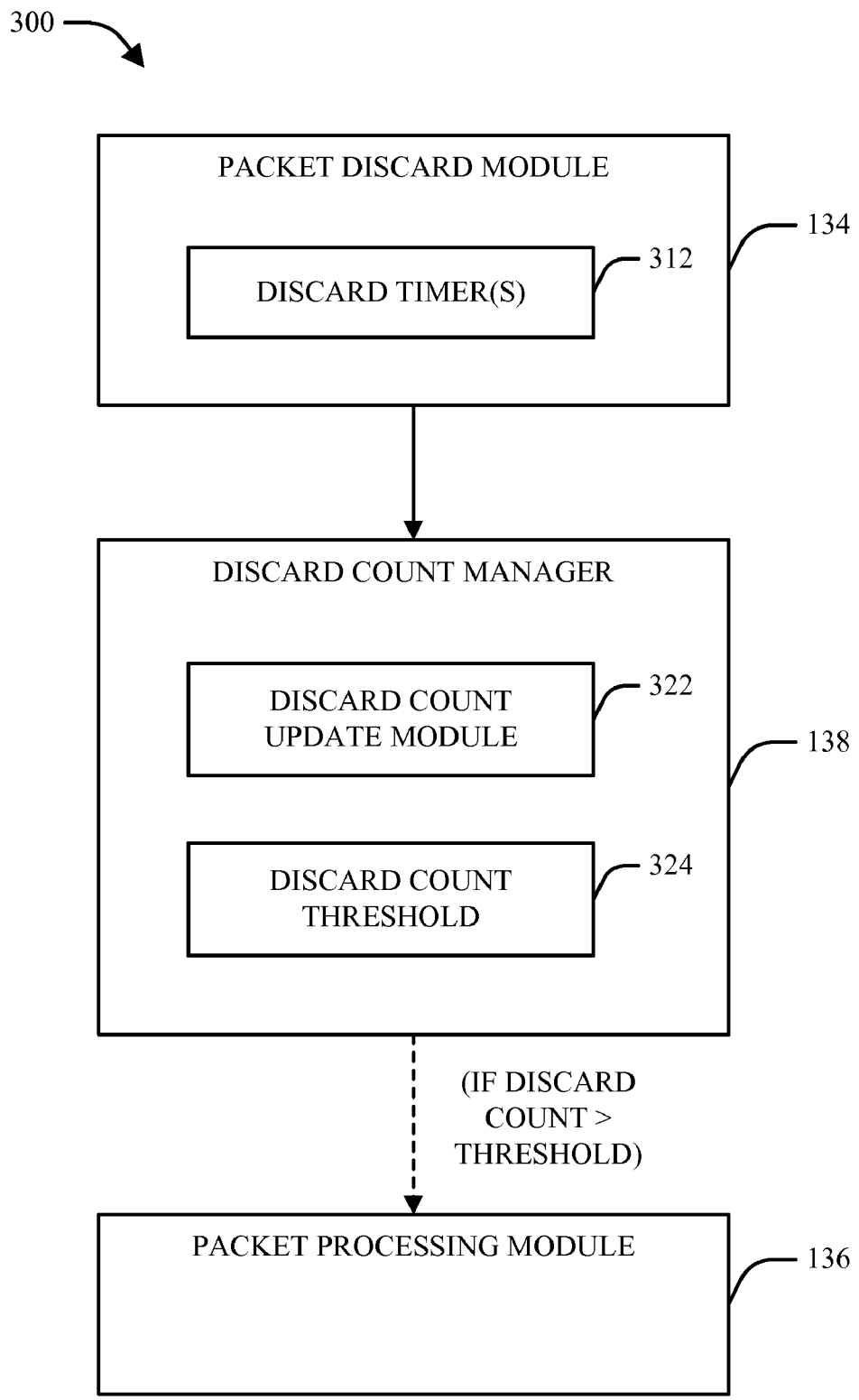
FIG. 3 is a block diagram of a system for threshold-based selective processing in connection with respective timer-based packet discards in accordance with various aspects.

Turning next to FIG. 3, an example implementation of discard count manager 138 is illustrated in further detail by diagram 300. In particular, diagram 300 illustrates example interactions that can be performed between a packet discard module 134, a discard count manager 138, and a packet discard module 136. It should be appreciated that the techniques illustrated by diagram 300 can be implemented by a user or terminal device (e.g., UE 120); a network entity, network cell, or Node B device (e.g., eNB 110); and/or any other suitable wireless communication device. Further, it should be appreciated that the modules illustrated in diagram 300 and their related functionality as described herein are not intended to be exhaustive of the possible modules and/or operations that can be performed. It should additionally be appreciated that the claimed subject matter not intended to be limited to any specific set of modules and/or operations unless explicitly stated otherwise.

In accordance with one aspect, packet discard module 134 can operate based on respective discard timers 312 configured for corresponding PDCP entities as generally described above. In one example, upon expiration of a discard timer 312 corresponding to one or more SDUs and/or other packets, packet discard module 134 can facilitate discarding of the packet(s) in accordance with various aspects described herein. Subsequently, discard count module 138 can utilize a discard count update module 322 and/or other suitable means to increment a discard count for the corresponding PDCP entity.

A discard count utilized by discard count update module 322 can correspond to, for example, a number of consecutive or successive packets that have been discarded by packet discard module 134. Thus, in one example, discard count manager can compare the current number of consecutively discarded packets associated with a given PDCP entity as indicated by a discard count for the PDCP entity to a pre-defined discard count threshold 324 upon discarding a packet. Based on this comparison, discard count manager can selectively coordinate subsequent processing of remaining queued packets such that the subsequent processing only occurs if the number of consecutive discarded packets for a PDCP entity as indicated by its discard count exceeds the discard count threshold 324. Stated another way, if the number of consecutively discarded packets as indicated by a corresponding discard count is not greater than the discard count threshold 324, one or more discard processing steps performed by packet processing module 136 can be bypassed. As a result, it can be appreciated that if a transmitting PDCP entity discards fewer SDUs or other packets than an amount defined by discard count threshold 324, respective discard operations (e.g., as performed by modules 202-208) can be avoided, thereby reducing overall complexity and the amount of required processor-intensive operations upon expiration of a discard timer 312 for one or more given PDCP SDUs and/or other types of packets.

Figure 4:
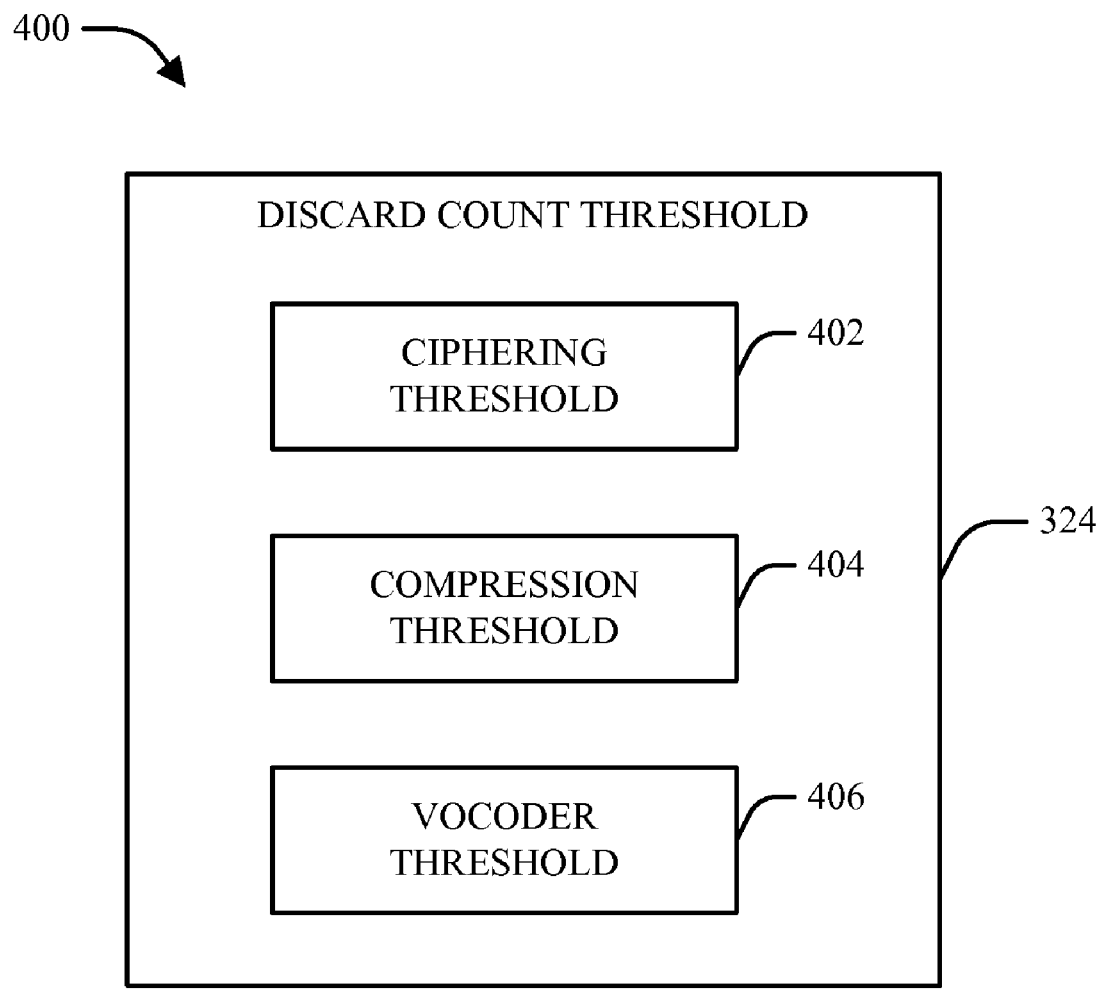
FIG. 4 is a block diagram of a system for packet discard threshold selection and/or computation in accordance with various aspects.

In accordance with another aspect, discard count threshold 324 can be chosen to leverage robustness of an associated transmitting device to a given amount of consecutive packet drops. An example of selection of a discard count threshold 324 is illustrated by diagram 400 in FIG. 4. As illustrated by diagram 400, a discard count threshold 324 can be selected based on the robustness of an associated ciphering engine to respective packet losses, which can be represented as a ciphering threshold 402; the robustness of an associated RoHC and/or other compression engine to respective packet losses, which can be represented as a compression threshold 404; a vocoder threshold 406 chosen as a function of a discontinuous transmission (DTX) cycle of an associated vocoder; and/or any other suitable factors.

By way of example, mechanisms can be provided within ciphering and/or compression procedures associated with a transmitting device to safeguard synchronization between the transmitting device and an intended receiver in the event that consecutive packets are lost during transmission. Thus, in accordance with one aspect, discard count threshold 324 can enable a preconfigured amount of consecutive discarded packets to be tolerated without further processing. By doing so, an associated device can be enabled to regard packet discards as a form of intentional packet loss such that the device can utilize techniques for recovering from successive lost packets to additionally recover from successive discarded packets.

In accordance with a further aspect, a discard count threshold 324 can be selected based on a ciphering threshold 402, a compression threshold 404, a vocoder threshold 406, and/or any other suitable threshold parameters or combinations thereof. In one example, ciphering threshold 402 can correspond to a minimum number of consecutive SDU discards that can potentially result in an associated transmitting device losing ciphering synchronization with an intended receiver. Ciphering threshold 402 can be chosen as a function of PDCP sequence length and/or any other suitable parameter(s).

Additionally or alternatively, compression threshold 404 can correspond to a minimum number of consecutive SDU discards that can potentially result in a compression engine (e.g., a RoHC engine) associated with a transmitting device losing synchronization with an intended receiver (e.g., causing a loss of synchronization between a compressor at a transmitting device and a decompressor at a receiving device). Compression threshold 404 can be chosen based on factors such as RoHC header type (e.g., Type 0 or Type 1), a desired level of tolerance to packet losses as defined in the implementation of an associated device, RoHC configuration parameters utilized by an associated device (e.g., parameters associated with an interpretation interval, etc.), or the like.

While diagram 400 illustrates a ciphering threshold 402, a compression threshold 404, and a vocoder threshold 406 utilized in the context of selecting a discard count threshold 324, it should be appreciated that a discard count threshold 324 can be selected as a function of any suitable threshold parameters or combinations thereof. Thus, by way of specific example, in the event that both RoHC and ciphering are configured for use by an associated device, a discard count threshold 324 can be chosen as the minimum of ciphering threshold 402 and compression threshold 404 and/or any other suitable function of ciphering threshold 402, compression threshold 404, and/or vocoder threshold 406. Alternatively, if RoHC is not configured for use by a given device, discard count threshold 324 can be selected as a function of ciphering threshold 402 (and/or vocoder threshold 406) alone. As another alternative, in the event that packet compression is not configured by a device associated with diagram 400, a discard count threshold 324 can be chosen to leverage an extent to which one or more PDCP techniques utilized by the device are robust to consecutive packet losses. In general, however, it should be appreciated that a discard count threshold 324 can be selected based on any suitable parameter(s), and that the claimed subject matter is not intended to be limited to any specific technique(s) for selecting a discard count threshold 324 unless explicitly stated otherwise.

Returning to FIG. 3, packet handling in the context of a discard timer expiration event can occur as described in the below example for a given discard count threshold 324 as selected in one or more manners generally described herein. Initially, upon expiration of a discard timer 312 associated with a given PDU, discard count manager 138 can determine if the PDU for which the discard timer expired is consecutive to a previously discarded PDCP PDU. If so, discard count update module 322 can increment the current discard count for a PDCP entity associated with the PDU. Otherwise, discard count update module 322 can set the discard count to 1 to reflect the fact that the current PDU is the first consecutive PDU to be discarded. At any suitable time before, during, or after this discard count update, packet discard module 134 can additionally facilitate discarding of the PDU for which the discard timer 312 expired.

Upon discarding the PDU for which the discard timer 312 expired and updating the discard timer accordingly, the discard timer can be compared to discard count threshold 324. In one example, if the discard count does not exceed discard count threshold 324, packet processing module 136 can be configured to omit substantially all processing of subsequent queued PDUs and packet discard module 134 can be configured to wait for a new discard timer expiration event.

Alternatively, if it is determined that the discard count does exceed discard count threshold 324, packet processing module 136 can be configured to perform one or more processing operations on respective subsequent PDUs, such as PDCP header modification, ciphering re-computation, updated header compression, or the like. In addition, discard count update module 322 can be configured to reset the discard count associated with the PDCP entity for which the PDU was discarded to 0 to indicate that packet processing module 136 has processed the respective PDUs. Following processing of subsequent PDUs and resetting the discard count, packet discard module 134 can be configured to attempt detection of a new discard timer expiration event.

Figure 5:
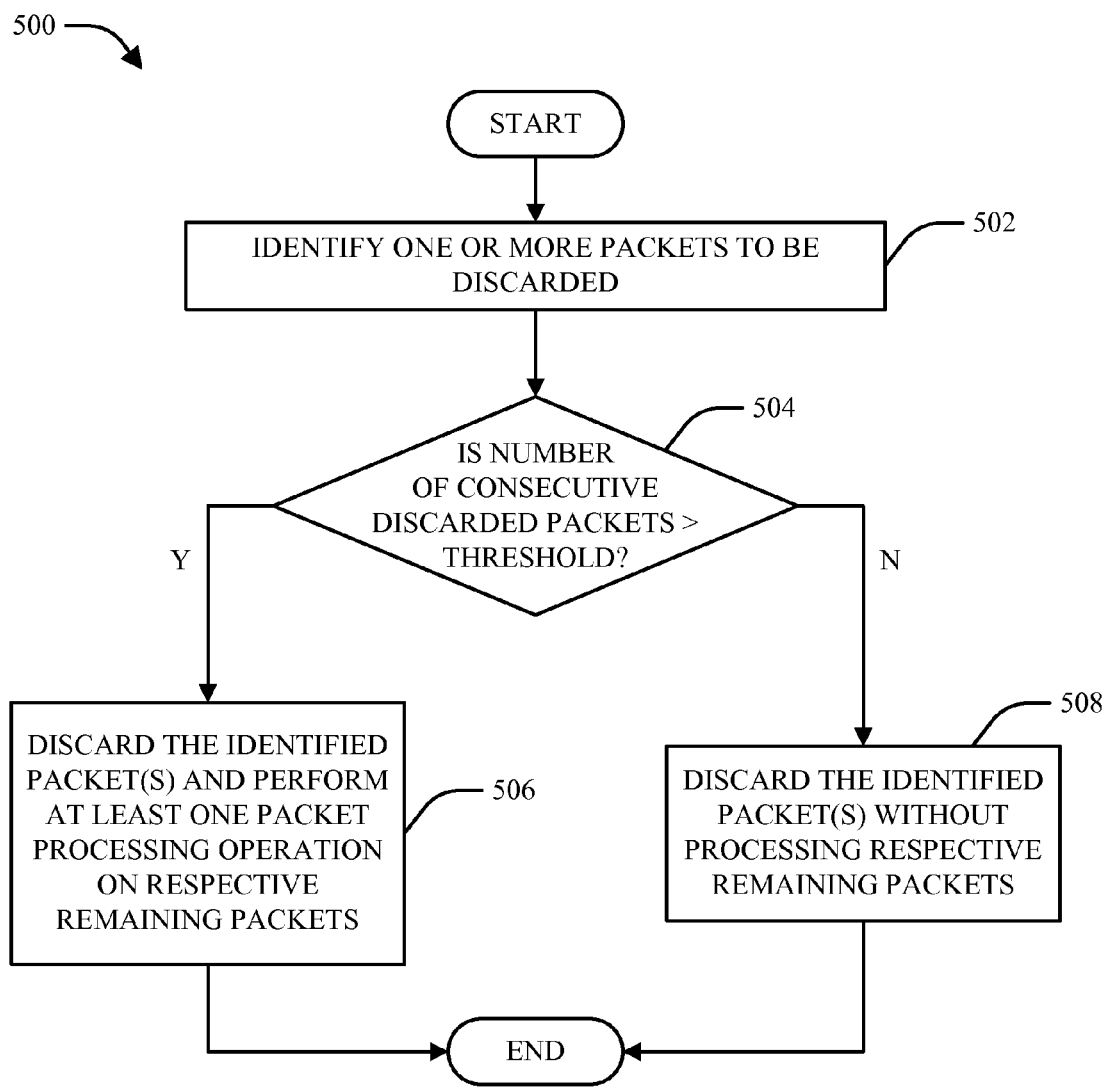
FIGS. 5-6 are flow diagrams of respective methodologies for efficient packet handling and/or processing in connection with a packet discard operation.
Figure 6:
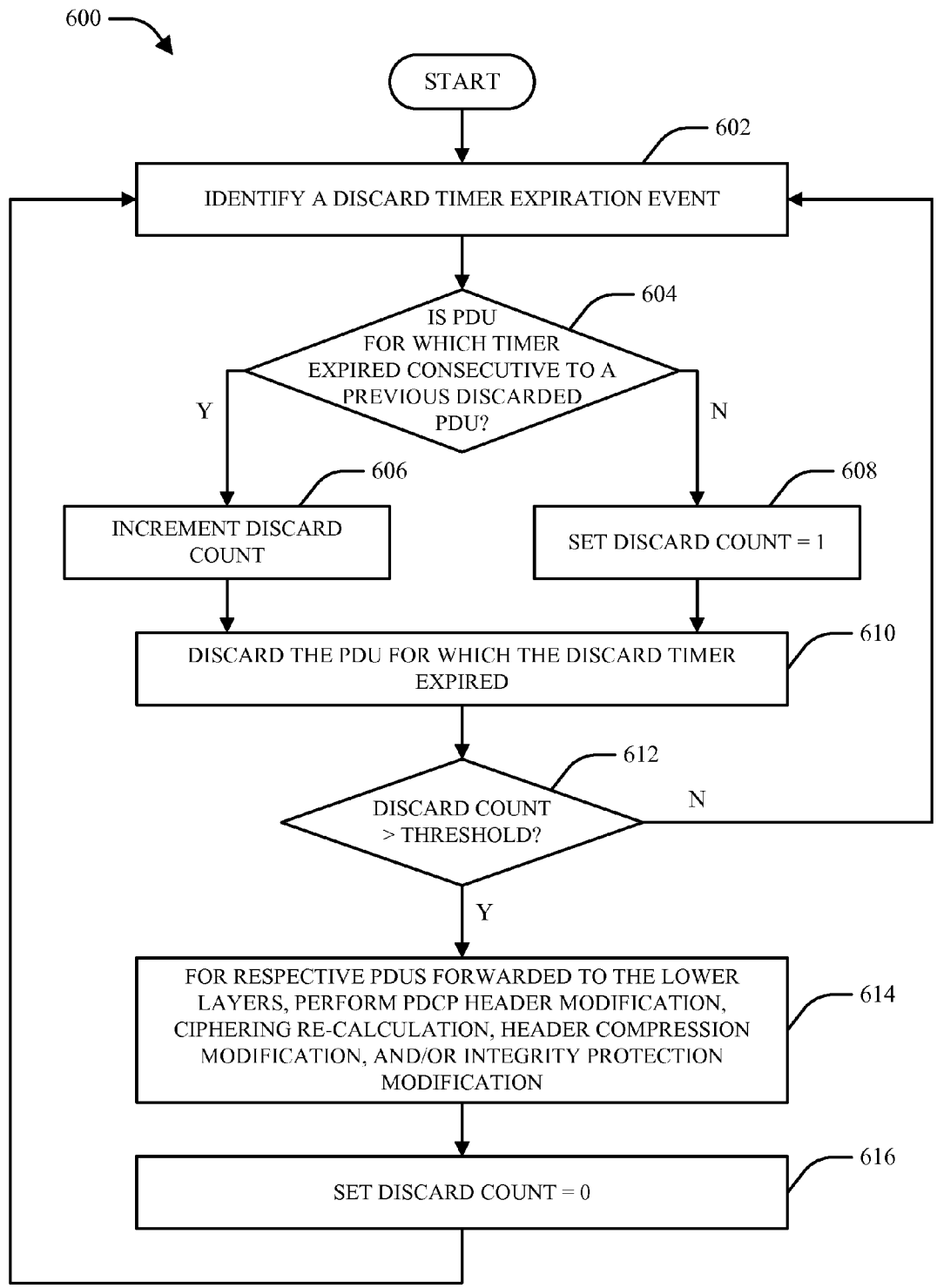
Figure 7:
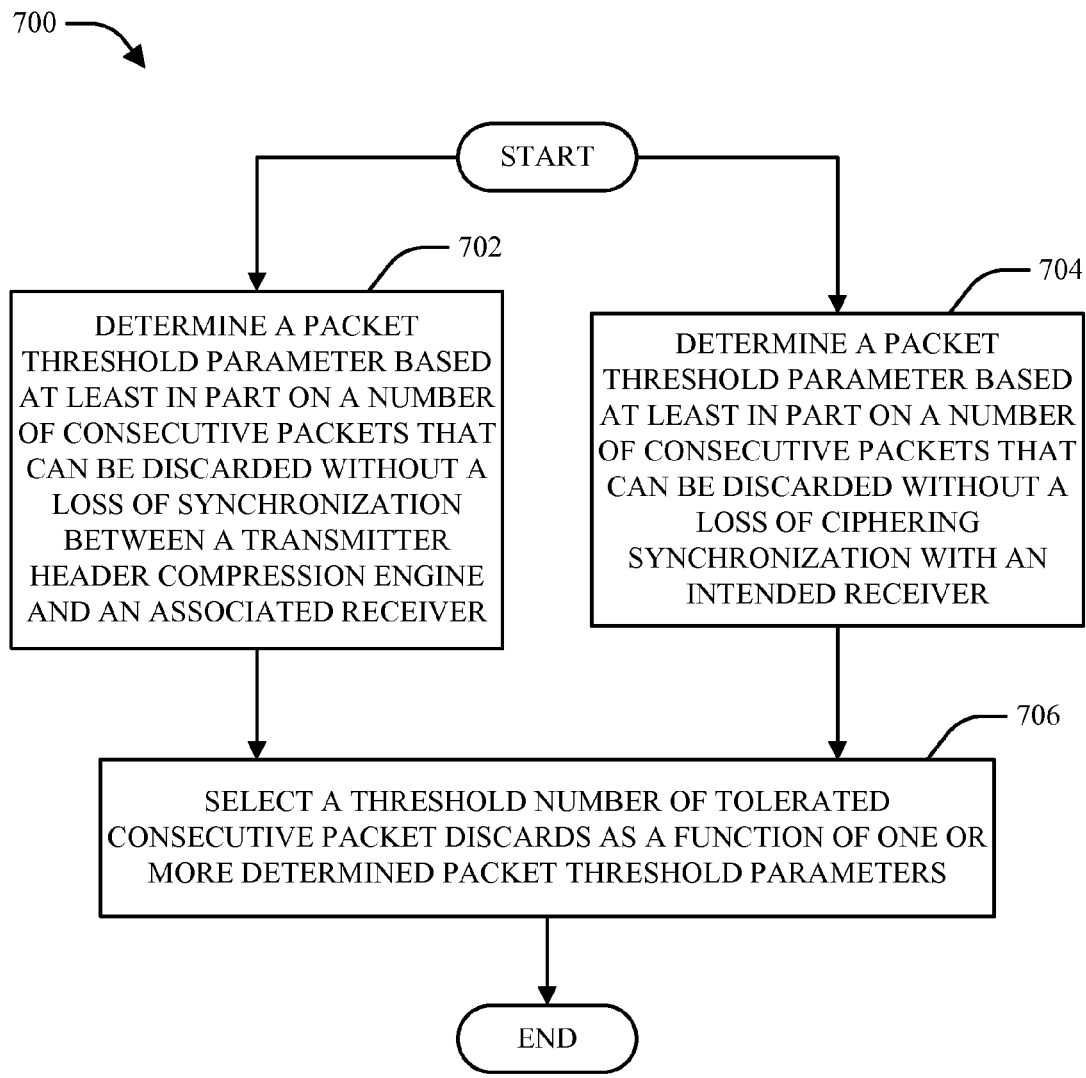
FIG. 7 is a flow diagram of a methodology for selecting a threshold to be utilized in connection with various improved PDU processing techniques described herein.

Referring now to FIGS. 5-7, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 5, illustrated is a methodology 500 for efficient packet handling and/or processing in connection with a packet discard operation. It is to be appreciated that methodology 500 can be performed by, for example, a Node B or eNB device (e.g., eNB 110), a terminal or user device (e.g., UE 120), and/or any other appropriate network device. Methodology 500 begins at block 502, wherein one or more packets (e.g., PDCP PDUs or SDUs) to be discarded are identified (e.g., by packet discard module 134). Next, at block 504, it is determined (e.g., by a discard count manager 138) whether the number of packets to be discarded will cause a number of consecutive discarded packets to become greater than a threshold number of packets (e.g., discard count threshold 324). In one example, a threshold utilized at block 504 can be based on a compression threshold (e.g., compression threshold 404), a ciphering threshold (e.g., ciphering threshold 402), a vocoder threshold (e.g., vocoder threshold 406), and/or any other suitable threshold(s).

Upon a positive determination at block 504, methodology 500 can conclude at block 506, wherein the packet(s) identified at block 502 are discarded and at least one packet processing operation is performed on respective remaining packets (e.g., by a packet processing module 136). Operations performed at block 506 can include, for example, PDCP header reconfiguration, recalculation of ciphering parameters, re-execution of packet compression (e.g., RoHC), or the like. Otherwise, methodology 500 can conclude as described at block 508, wherein the packet(s) identified at block 502 are discarded without processing the respective remaining packets.

Turning now to FIG. 6, a flow diagram of another methodology 600 for efficient packet handling and/or processing in connection with a packet discard operation is illustrated. In a similar manner to methodology 500, methodology 600 can be performed by a Node B or eNB device, a terminal or user device, and/or any other appropriate network entity. Methodology 600 begins at block 602, wherein a discard timer expiration event (e.g., corresponding to expiration of a discard timer 312 for a given PDU) is identified. Next, at block 604, it is determined whether a PDU corresponding to the discard timer expiration event at block 602 is consecutive to a previous discarded PDU. If the corresponding PDU is consecutive to a previous discarded PDU, methodology 600 can proceed to block 606, wherein a pre-configured discard count associated with the PDU (e.g., corresponding to a PDCP entity associated with transmission of the PDU) is incremented (e.g., by a discard count update module 322). Otherwise, it can be inferred that a continuous discard of successive packets has not occurred and methodology 600 can instead proceed to block 608, wherein the discard count associated with the PDU is set to 1.

Upon completion of the acts described at block 606 and/or block 608, methodology 600 can proceed to block 610, wherein the PDU corresponding to the discard timer expiration event is discarded. Subsequently, at block 612, it is determined whether the count of consecutive discarded packets (as maintained at blocks 606-608) exceeds a predefined threshold number of packets. If it is determined that the threshold number of packets has not been exceeded, methodology 600 returns to block 602 to detect a new discard timer expiration event. Alternatively, if the threshold number of packets has been exceeded, methodology 600 can instead proceed to block 614, wherein operations such as PDCP header modification, ciphering re-calculation, header compression modification, and/or integrity protection modification are performed for respective PDUs forwarded to the lower layers (e.g., to be queued for transmission). Methodology 600 can then proceed to block 616, wherein the discard count is reset to 0 to indicate that processing as described at block 614 has been performed, after which methodology 600 can return to block 602 to detect a new discard timer expiration event.

FIG. 7 illustrates a methodology 700 for selecting a threshold (e.g., discard count threshold 324) to be utilized in connection with various improved PDU processing techniques described herein. Methodology 700 can be performed by, for example, an eNB, a UE, and/or any other suitable network entity. As FIG. 7 illustrates, methodology 700 can begin by performing respective acts as described by block 702 and/or block 704. More particularly, at block 702, a packet threshold parameter (e.g., compression threshold 404) can be determined based at least in part on a number of consecutive packets that can be discarded without a loss of synchronization between a transmitter header compression engine (e.g., a RoHC engine) and an associated receiver. In one example, a packet threshold parameter can be selected at block 702 based on a header type utilized by an associated set of packets, a desired level of resistance of an entity performing methodology 700 to packet loss or synchronization loss, and/or any other suitable factor(s).

Additionally or alternatively, at block 704, a packet threshold parameter (e.g., ciphering threshold 402) can be determined based at least in part on a number of consecutive packets that can be discarded without a loss of ciphering synchronization with an intended receiver. A packet threshold parameter can be selected at block 704 based on, for example, a PDCP sequence length utilized for packet transmission and/or any other suitable information.

In accordance with one aspect, upon completing the acts described at block 702 and/or block 704, methodology 700 can proceed to block 706, wherein a threshold number of tolerated packet discards is selected as a function of one or more determined packet threshold parameters. For example, a threshold number of tolerated packet discards can be selected at block 706 as one of a compression threshold parameter as determined at block 702, a ciphering threshold parameter as determined at block 704, a threshold parameter computed as a function of a DTX cycle of a vocoder associated with an entity performing methodology 700 (e.g., vocoder threshold 406), as a function of respective threshold parameters determined at blocks 702 and 704 or otherwise (e.g., a minimum of a header compression threshold and a ciphering threshold and/or any other suitable function of threshold parameters), and/or any other suitable combination of packet threshold parameters as determined at blocks 702-704 or otherwise.

Figure 8:
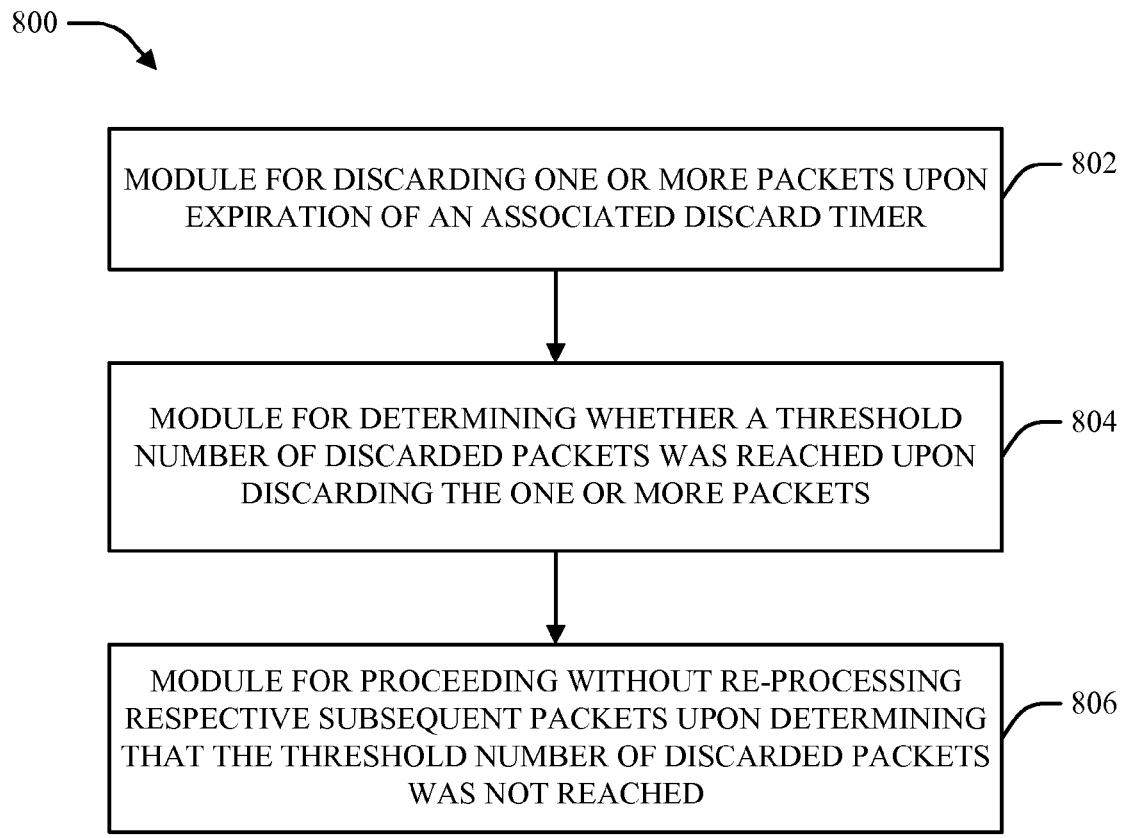
FIG. 8 is a block diagram of a system that facilitates efficient PDU handling for timer-based discards in a wireless communication system.

Referring next to FIG. 8, illustrated is an apparatus 800 that facilitates efficient PDU handling for timer-based discards in a wireless communication system. It is to be appreciated that apparatus 800 is represented as including functional blocks, which can be functional blocks that represent functions implemented by a processor, software, or combination thereof (e.g., firmware). Apparatus 800 can be implemented by a base station (e.g., eNB 110), a mobile terminal (e.g., UE 120), and/or any other suitable network entity and can include a module 802 for discarding one or more packets upon expiration of an associated discard timer, a module 804 for determining whether a threshold number of discarded packets was reached upon discarding the one or more packets, and a module 806 for proceeding without re-processing respective subsequent packets upon determining that the threshold number of discarded packets was not reached.

Figure 9:
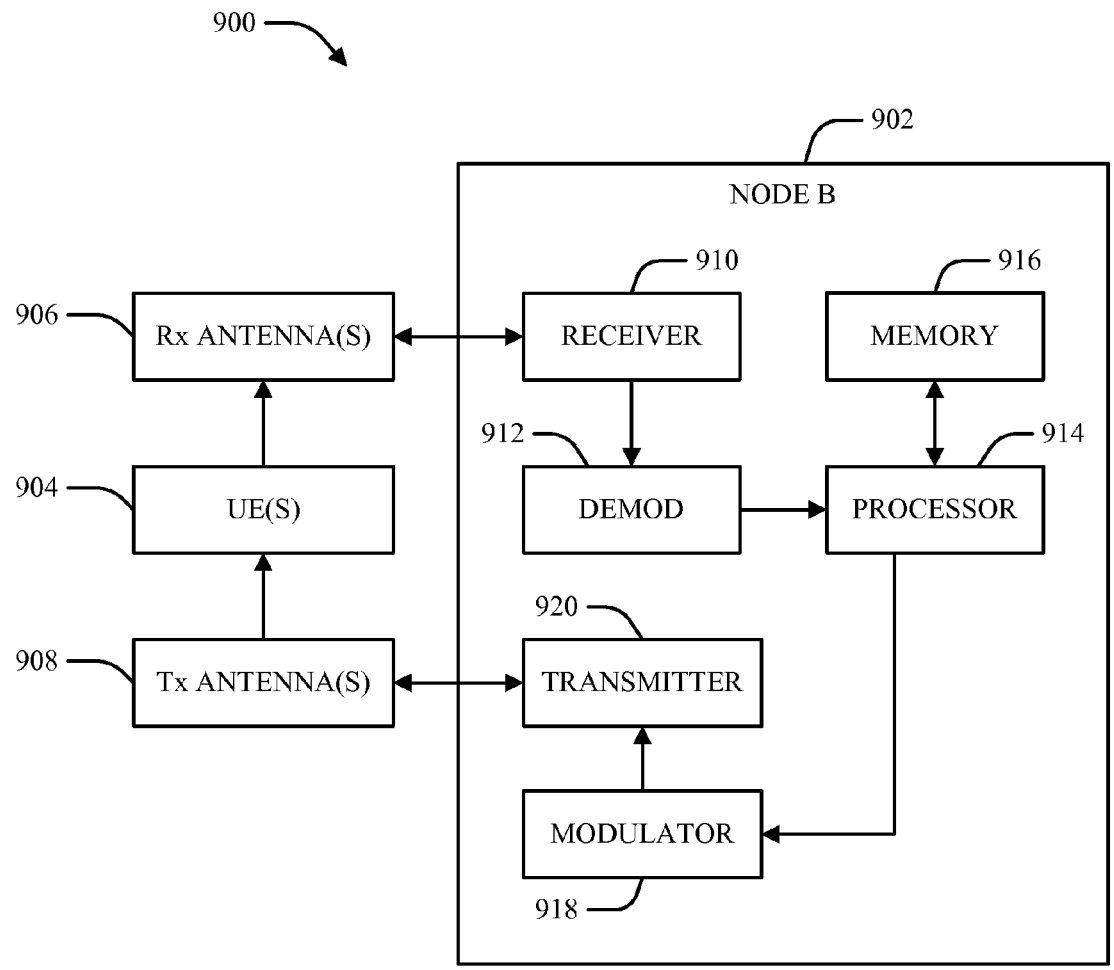
FIGS. 9-10 are block diagrams of respective wireless communication devices that can be utilized to implement various aspects described herein.

FIG. 9 is a block diagram of a system 900 that can be utilized to implement various aspects of the functionality described herein. In one example, system 900 includes a base station or Node B 902. As illustrated, Node B 902 can receive signal(s) from one or more UEs 904 via one or more receive (Rx) antennas 906 and transmit to the one or more UEs 904 via one or more transmit (Tx) antennas 908. Additionally, Node B 902 can comprise a receiver 910 that receives information from receive antenna(s) 906. In one example, the receiver 910 can be operatively associated with a demodulator (Demod) 912 that demodulates received information. Demodulated symbols can then be analyzed by a processor 914. Processor 914 can be coupled to memory 916, which can store information related to code clusters, access terminal assignments, lookup tables related thereto, unique scrambling sequences, and/or other suitable types of information. Additionally, Node B 902 can employ processor 914 to perform methodologies 500-700 and/or other similar and appropriate methodologies. In one example, Node B 902 can also include a modulator 918 that can multiplex a signal for transmission by a transmitter 920 through transmit antenna(s) 908.

Figure 10:
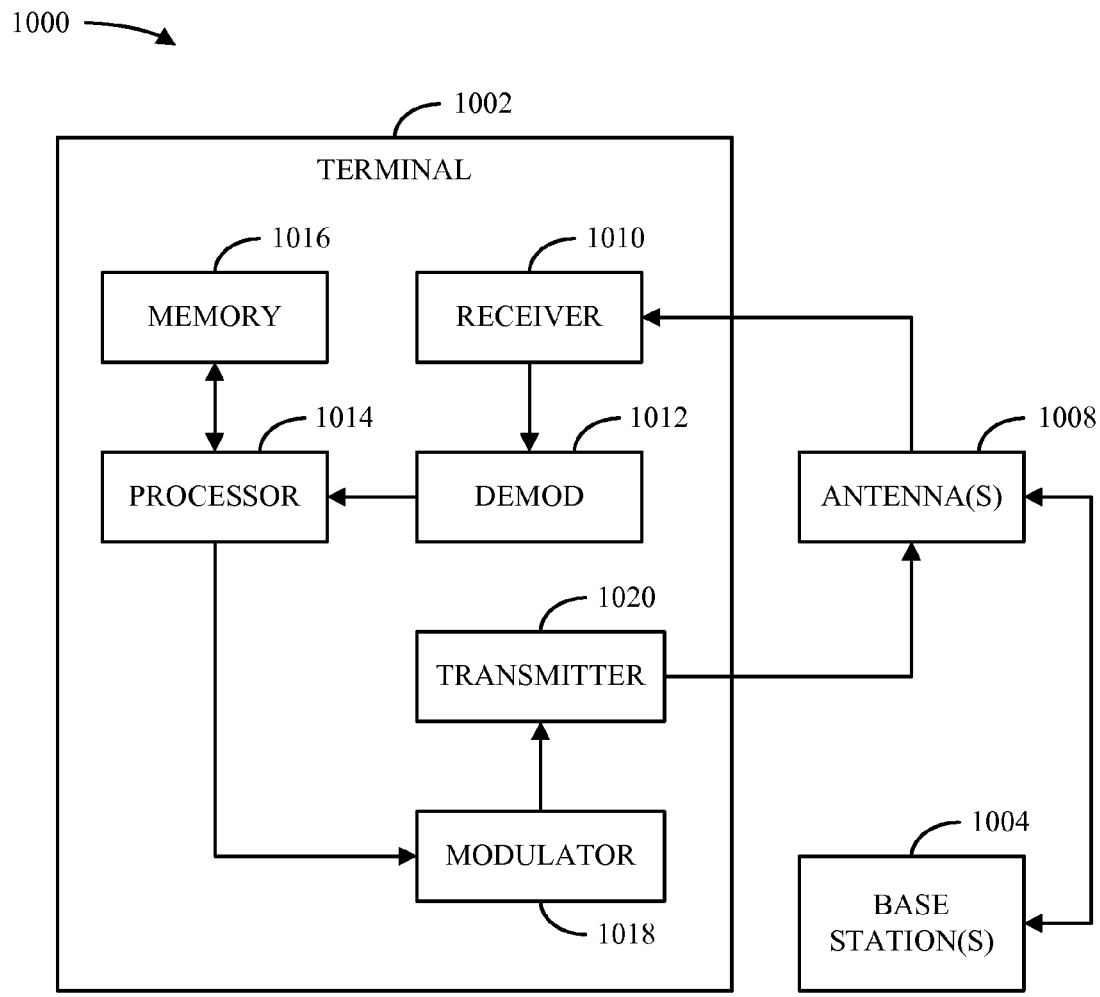

FIG. 10 is a block diagram of another system 1000 that can be utilized to implement various aspects of the functionality described herein. In one example, system 1000 includes a mobile terminal 1002. As illustrated, mobile terminal 1002 can receive signal(s) from one or more base stations 1004 and transmit to the one or more base stations 1004 via one or more antennas 1008. Additionally, mobile terminal 1002 can comprise a receiver 1010 that receives information from antenna(s) 1008. In one example, receiver 1010 can be operatively associated with a demodulator (Demod) 1012 that demodulates received information. Demodulated symbols can then be analyzed by a processor 1014. Processor 1014 can be coupled to memory 1016, which can store data and/or program codes related to mobile terminal 1002. Additionally, mobile terminal 1002 can employ processor 1014 to perform methodologies 500-700 and/or other similar and appropriate methodologies. Mobile terminal 1002 can also include a modulator 1018 that can multiplex a signal for transmission by a transmitter 1020 through antenna(s) 1008.

Figure 11:
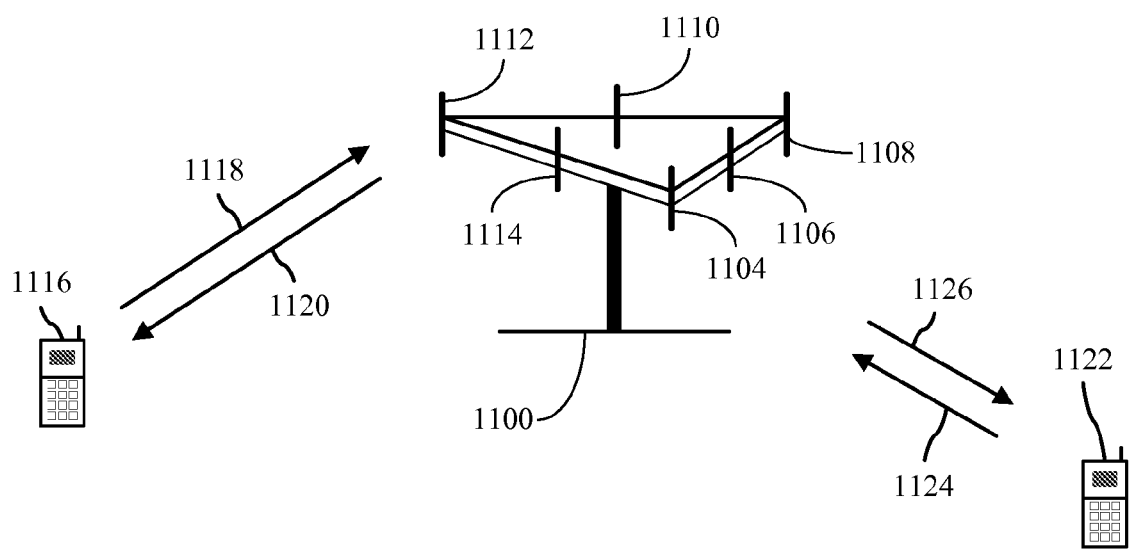
FIG. 11 illustrates a wireless multiple-access communication system in accordance with various aspects set forth herein.

Referring now to FIG. 11, an illustration of a wireless multiple-access communication system is provided in accordance with various aspects. In one example, an access point 1100 (AP) includes multiple antenna groups. As illustrated in FIG. 11, one antenna group can include antennas 1104 and 1106, another can include antennas 1108 and 1110, and another can include antennas 1112 and 1114. While only two antennas are shown in FIG. 11 for each antenna group, it should be appreciated that more or fewer antennas may be utilized for each antenna group. In another example, an access terminal 1116 can be in communication with antennas 1112 and 1114, where antennas 1112 and 1114 transmit information to access terminal 1116 over forward link 1120 and receive information from access terminal 1116 over reverse link 1118. Additionally and/or alternatively, access terminal 1122 can be in communication with antennas 1106 and 1108, where antennas 1106 and 1108 transmit information to access terminal 1122 over forward link 1126 and receive information from access terminal 1122 over reverse link 1124. In a frequency division duplex system, communication links 1118, 1120, 1124 and 1126 can use different frequency for communication. For example, forward link 1120 may use a different frequency then that used by reverse link 1118.

Each group of antennas and/or the area in which they are designed to communicate can be referred to as a sector of the access point. In accordance with one aspect, antenna groups can be designed to communicate to access terminals in a sector of areas covered by access point 1100. In communication over forward links 1120 and 1126, the transmitting antennas of access point 1100 can utilize beamforming in order to improve the signal-to-noise ratio of forward links for the different access terminals 1111 and 1122. Also, an access point using beamforming to transmit to access terminals scattered randomly through its coverage causes less interference to access terminals in neighboring cells than an access point transmitting through a single antenna to all its access terminals.

An access point, e.g., access point 1100, can be a fixed station used for communicating with terminals and can also be referred to as a base station, an eNB, an access network, and/or other suitable terminology. In addition, an access terminal, e.g., an access terminal 1116 or 1122, can also be referred to as a mobile terminal, user equipment, a wireless communication device, a terminal, a wireless terminal, and/or other appropriate terminology.

Figure 12:
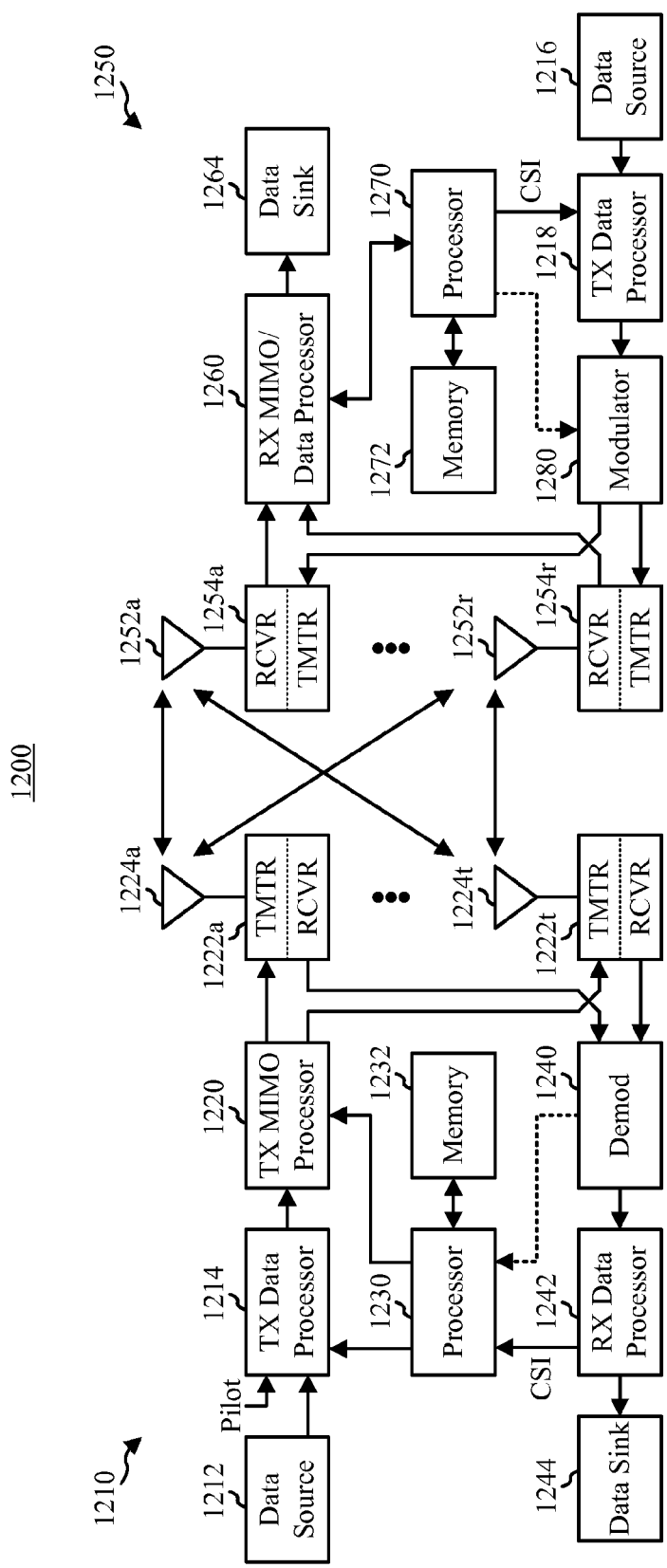
FIG. 12 is a block diagram illustrating an example wireless communication system in which various aspects described herein can function.

Referring now to FIG. 12, a block diagram illustrating an example wireless communication system 1200 in which various aspects described herein can function is provided. In one example, system 1200 is a multiple-input multiple-output (MIMO) system that includes a transmitter system 1210 and a receiver system 1250. It should be appreciated, however, that transmitter system 1210 and/or receiver system 1250 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1210 and/or receiver system 1250 described herein could be utilized in connection with a single output to single input antenna system.

In accordance with one aspect, traffic data for a number of data streams are provided at transmitter system 1210 from a data source 1212 to a transmit (TX) data processor 1214. In one example, each data stream can then be transmitted via a respective transmit antenna 1224. Additionally, TX data processor 1214 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1250 to estimate channel response. Back at transmitter system 1210, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1230.

Next, modulation symbols for all data streams can be provided to a TX processor 1220, which can further process the modulation symbols (e.g., for OFDM). TX MIMO processor 1220 can then provides $N_T$ modulation symbol streams to $N_T$ transceivers 1222a through 1222t. In one example, each transceiver 1222 can receive and process a respective symbol stream to provide one or more analog signals. Each transceiver 1222 can then further condition (e.g., amplify, filter, and upconvert) the analog signals to provide a modulated signal suitable for transmission over a MIMO channel. Accordingly, $N_T$ modulated signals from transceivers 1222a through 1222t can then be transmitted from $N_T$ antennas 1224a through 1224t, respectively.

In accordance with another aspect, the transmitted modulated signals can be received at receiver system 1250 by $N_R$ antennas 1252a through 1252r. The received signal from each antenna 1252 can then be provided to respective transceivers 1254. In one example, each transceiver 1254 can condition (e.g., filter, amplify, and downconvert) a respective received signal, digitize the conditioned signal to provide samples, and then processes the samples to provide a corresponding "received" symbol stream. An RX MIMO/data processor 1260 can then receive and process the $N_R$ received symbol streams from $N_R$ transceivers 1254 based on a particular receiver processing technique to provide $N_T$ "detected" symbol streams. In one example, each detected symbol stream can include symbols that are estimates of the modulation symbols transmitted for the corresponding data stream. RX processor 1260 can then process each symbol stream at least in part by demodulating, deinterleaving, and decoding each detected symbol stream to recover traffic data for a corresponding data stream. Thus, the processing by RX processor 1260 can be complementary to that performed by TX MIMO processor 1220 and TX data processor 1216 at transmitter system 1210. RX processor 1260 can additionally provide processed symbol streams to a data sink 1264.

In accordance with one aspect, the channel response estimate generated by RX processor 1260 can be used to perform space/time processing at the receiver, adjust power levels, change modulation rates or schemes, and/or other appropriate actions. Additionally, RX processor 1260 can further estimate channel characteristics such as, for example, signal-to-noise-and-interference ratios (SNRs) of the detected symbol streams. RX processor 1260 can then provide estimated channel characteristics to a processor 1270. In one example, RX processor 1260 and/or processor 1270 can further derive an estimate of the "operating" SNR for the system. Processor 1270 can then provide channel state information (CSI), which can comprise information regarding the communication link and/or the received data stream. This information can include, for example, the operating SNR. The CSI can then be processed by a TX data processor 1218, modulated by a modulator 1280, conditioned by transceivers 1254a through 1254r, and transmitted back to transmitter system 1210. In addition, a data source 1216 at receiver system 1250 can provide additional data to be processed by TX data processor 1218.

Back at transmitter system 1210, the modulated signals from receiver system 1250 can then be received by antennas 1224, conditioned by transceivers 1222, demodulated by a demodulator 1240, and processed by a RX data processor 1242 to recover the CSI reported by receiver system 1250. In one example, the reported CSI can then be provided to processor 1230 and used to determine data rates as well as coding and modulation schemes to be used for one or more data streams. The determined coding and modulation schemes can then be provided to transceivers 1222 for quantization and/or use in later transmissions to receiver system 1250. Additionally and/or alternatively, the reported CSI can be used by processor 1230 to generate various controls for TX data processor 1214 and TX MIMO processor 1220. In another example, CSI and/or other information processed by RX data processor 1242 can be provided to a data sink 1244.

In one example, processor 1230 at transmitter system 1210 and processor 1270 at receiver system 1250 direct operation at their respective systems. Additionally, memory 1232 at transmitter system 1210 and memory 1272 at receiver system 1250 can provide storage for program codes and data used by processors 1230 and 1270, respectively. Further, at receiver system 1250, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   identifying one or more packets to be discarded;
   selecting a threshold number of packets based on a number of consecutive packets that can be discarded without a loss of synchronization between a transmitter Robust Header Compression (RoHC) engine associated with a set of packets and an intended receiver of the set of packets;
   determining whether a number of packets to be discarded will cause a number of consecutive discarded packets to become greater than the threshold number of packets;
   upon determining that the number of packets to be discarded will cause the number of consecutive discarded packets to become greater than the threshold number of packets, discarding the one or more packets and performing at least one packet processing operation on respective remaining identified packets; and
   upon determining that the number of packets to be discarded will not cause the number of consecutive discarded packets to become greater than the threshold number of packets, discarding the one or more packets without processing respective remaining identified packets.

2. The method of claim 1, wherein the at least one packet processing operation comprises one or more of Packet Data Convergence Protocol (PDCP) header reconfiguration, recalculation of ciphering parameters, or re-execution of Robust Header Compression (RoHC).

3. The method of claim 1, wherein the packets to be discarded comprises a Packet Data Convergence Protocol (PDCP) Protocol Data Unit (PDU).

4. The method of claim 1, wherein the identifying comprises identifying one or more packets for which a corresponding discard timer has expired.

5. The method of claim 1, wherein the selecting comprises selecting the threshold number of packets based on a header type utilized by the set of packets.

6. The method of claim 1, wherein the selecting comprises selecting the threshold number of packets based on a desired level of resistance to packet loss or synchronization loss.

7. A method, comprising:
identifying one or more packets to be discarded;
selecting a threshold number of packets as a function of a discontinuous transmission (DTX) cycle of an associated vocoder utilized for packet transmission;
determining whether a number of packets to be discarded will cause a number of consecutive discarded packets to become greater than the threshold number of packets;
upon determining that the number of packets to be discarded will cause the number of consecutive discarded packets to become greater than the threshold number of packets, discarding the one or more packets and performing at least one packet processing operation on respective remaining identified packets; and
upon determining that the number of packets to be discarded will not cause the number of consecutive discarded packets to become greater than the threshold number of packets, discarding the one or more packets without processing respective remaining identified packets.

8. A method, comprising:
identifying one or more packets to be discarded;
selecting a threshold number of packets based on a number of consecutive packets that can be discarded without a loss of ciphering synchronization with an intended packet receiver;
determining whether a number of packets to be discarded will cause a number of consecutive discarded packets to become greater than the threshold number of packets;
upon determining that the number of packets to be discarded will cause the number of consecutive discarded packets to become greater than the threshold number of packets, discarding the one or more packets and performing at least one packet processing operation on respective remaining identified packets; and
upon determining that the number of packets to be discarded will not cause the number of consecutive discarded packets to become greater than the threshold number of packets, discarding the one or more packets without processing respective remaining identified packets.

9. The method of claim 8, wherein the selecting comprises selecting the threshold number of packets based on a Packet Data Convergence Protocol (PDCP) sequence length utilized for packet transmission.

10. A method, comprising:
identifying one or more packets to be discarded;
selecting a threshold number of packets as a function of at least one of a header compression threshold, a vocoder threshold, or a ciphering threshold;
determining whether a number of packets to be discarded will cause a number of consecutive discarded packets to become greater than the threshold number of packets;
upon determining that the number of packets to be discarded will cause the number of consecutive discarded packets to become greater than the threshold number of packets, discarding the one or more packets and performing at least one packet processing operation on respective remaining identified packets; and
upon determining that the number of packets to be discarded will not cause the number of consecutive discarded packets to become greater than the threshold number of packets, discarding the one or more packets without processing respective remaining identified packets.

11. The method of claim 10, wherein the selecting comprises selecting the threshold number of packets as a minimum of two or more of a header compression threshold, a vocoder threshold, or a ciphering threshold.

12. A method, comprising:
identifying one or more packets to be discarded;
initializing a count of consecutive discarded packets and incrementing the count of consecutive discarded packets upon identifying a packet to be discarded;
determining whether a number of packets to be discarded will cause a number of consecutive discarded packets to become greater than a threshold number of packets, the determining comprising determining whether the count of consecutive discarded packets exceeds the threshold number of packets; and
upon determining that the number of packets to be discarded will cause the number of consecutive discarded packets to become greater than the threshold number of packets, discarding the one or more packets and performing at least one packet processing operation on respective remaining identified packets, the at least one packet processing operation comprising resetting the count of consecutive discarded packets; and
upon determining that the number of packets to be discarded will not cause the number of consecutive discarded packets to become greater than the threshold number of packets, discarding the one or more packets without processing respective remaining identified packets.

13. A wireless communications apparatus, comprising:
a memory that stores data relating to a Packet Data Convergence Protocol (PDCP) entity and respective packets associated with the PDCP entity, the respective packets comprising one or more designated packets to be discarded and one or more subsequent packets; and
a processor configured to
discard the one or more designated packets,
select a threshold number of packets based on a number of consecutive packets that can be discarded without a loss of synchronization between a transmitter Robust Header Compression (RoHC) engine utilized by the wireless communications apparatus and an intended receiving device,
determine whether discarding the one or more designated packets caused a number of consecutive discarded packets to become greater than the threshold number of packets, and
perform at least one packet processing operation on respective subsequent packets upon a determination that the number of consecutive discarded packets has become greater than the threshold number of packets.

14. The wireless communications apparatus of claim 13, wherein the at least one packet processing operation comprises one or more of PDCP header reconfiguration, recalculation of ciphering parameters, or re-execution of Robust Header Compression (RoHC).

15. The wireless communications apparatus of claim 13, wherein the respective packets are PDCP Protocol Data Units (PDUs).

16. The wireless communications apparatus of claim 13, wherein the memory further stores data relating to a discard timer associated with the PDCP entity and the processor is further configured to identify the one or more designated packets to be discarded at least in part by identifying respective packets for which the discard timer has expired.

17. The wireless communications apparatus of claim 13, wherein the processor is further configured to select the threshold number of packets based on a header type utilized by the respective packets associated with the PDCP entity.

18. The wireless communications apparatus of claim 13, wherein the processor is further configured to select the threshold number of packets based on a desired level of resistance of the wireless communications apparatus to packet loss or synchronization loss.

19. A wireless communications apparatus, comprising:
a memory that stores data relating to a Packet Data Convergence Protocol (PDCP) entity and respective packets associated with the PDCP entity, the respective packets comprising one or more designated packets to be discarded and one or more subsequent packets; and
a processor configured to
discard the one or more designated packets,
select a threshold number of packets as a function of a discontinuous transmission (DTX) cycle utilized by a vocoder associated with the wireless communications apparatus,
determine whether discarding the one or more designated packets caused a number of consecutive discarded packets to become greater than the threshold number of packets, and
perform at least one packet processing operation on respective subsequent packets upon a determination that the number of consecutive discarded packets has become eater than the threshold number of packets.

20. A wireless communications apparatus, comprising:
a memory that stores data relating to a Packet Data Convergence Protocol (PDCP) entity and respective packets associated with the PDCP entity, the respective packets comprising one or more designated packets to be discarded and one or more subsequent packets, and
a processor configured to
discard the one or more designated packets,
select a threshold number of packets based on a number of consecutive packets that can be discarded by the wireless communications apparatus without a loss of ciphering synchronization with a receiving device,
determine whether discarding the one or more designated packets caused a number of consecutive discarded packets to become greater than the threshold number of packets, and
perform at least one packet processing operation on respective subsequent packets upon a determination that the number of consecutive discarded packets has become greater than the threshold number of packets.

21. The wireless communications apparatus of claim 20, wherein the processor is further configured to select the threshold number of packets based on a PDCP sequence length utilized for transmission by the wireless communications apparatus.

22. A wireless communications apparatus, comprising:
a memory that stores data relating to a Packet Data Convergence Protocol (PDCP) entity and respective packets associated with the PDCP entity, the respective packets comprising one or more designated packets to be discarded and one or more subsequent packets; and
a processor configured to
discard the one or more designated packets,
select a threshold number of packets as a function of at least one of a header compression threshold, a ciphering threshold, or a vocoder threshold,
determine whether discarding the one or more designated packets caused a number of consecutive discarded packets to become greater than the threshold number of packets, and
perform at least one packet processing operation on respective subsequent packets upon a determination that the number of consecutive discarded packets has become greater than the threshold number of packets.

23. A wireless communications apparatus, comprising:
a memory that stores data relating to
a Packet Data Convergence Protocol (PDCP) entity and respective packets associated with the PDCP entity, the respective packets comprising one or more designated packets to be discarded and one or more subsequent packets, and data relating to a count of consecutive discarded packets; and
a processor configured to
discard the one or more designated packets,
increment the count of consecutive discarded packets upon discarding the one or more designated packets,
determine whether discarding the one or more designated packets caused a number of consecutive discarded packets to become greater than a threshold number of packets, and
perform at least one packet processing operation on respective subsequent packets upon a determination that the number of consecutive discarded packets has become greater than the threshold number of packets, at least one packet processing operation comprising determining whether the count of consecutive discarded packets exceeds the threshold number of packets upon discarding the one or more designated packets, and resetting the count of consecutive discarded packets upon determining that the count of consecutive discarded packets exceeds the threshold number of packets.

24. An apparatus, comprising:
means for discarding one or more packets upon expiration of an associated discard timer;
means for selecting a threshold number of discarded packets based on a number of consecutive packets that can be discarded without a loss of synchronization between a transmitter Robust Header Compression (RoHC) engine associated with the apparatus and an intended receiving device;
means for determining whether the threshold number of discarded packets was reached upon discarding the one or more packets; and
means for proceeding without re-processing respective subsequent packets upon determining that the threshold number of discarded packets was not reached upon discarding the one or more packets.

25. The apparatus of claim 24, further comprising means for performing at least one processing operation on the respective subsequent packets upon determining that the threshold number of discarded packets was reached upon discarding the one or more packets, the at least one processing operation comprising one or more of Packet Data Convergence Protocol (PDCP) header reconfiguration, recalculation of ciphering parameters, or re-execution of Robust Header Compression (RoHC).

26. The apparatus of claim 24, wherein the one or more packets discarded by the means for discarding and the respective subsequent packets comprise Packet Data Convergence Protocol (PDCP) Protocol Data Units (PDUs).

27. The apparatus of claim 24, wherein the means for selecting comprises means for selecting the threshold number of discarded packets based on at least one of a header type utilized by respective packets communicated by the apparatus or a desired level of resistance of the apparatus to packet loss or synchronization loss.

28. An apparatus, comprising:
means for discarding one or more packets upon expiration of an associated discard timer;
means for selecting a threshold number of discarded packets as a function of a discontinuous transmission (DTX) cycle of a vocoder associated with the apparatus;
means for determining whether the threshold number of discarded packets was reached upon discarding the one or more packets; and
means for proceeding without re-processing respective subsequent packets upon determining that the threshold number of discarded packets was not reached upon discarding the one or more packets.

29. An apparatus, comprising:
means for discarding one or more packets upon expiration of an associated discard timer;
means for selecting a threshold number of discarded packets based on a number of consecutive packets that can be discarded without a loss of ciphering synchronization between the apparatus and an intended receiving device;
means for determining whether the threshold number of discarded packets was reached upon discarding the one or more packets; and
means for proceeding without re-processing respective subsequent packets upon determining that the threshold number of discarded packets was not reached upon discarding the one or more packets.

30. The apparatus of claim 29, wherein the means for selecting comprises means for selecting the threshold number of discarded packets based on a Packet Data Convergence Protocol (PDCP) sequence length utilized for transmission by the apparatus.

31. An apparatus, comprising:
means for discarding one or more packets upon expiration of an associated discard timer;
means for selecting a threshold number of discarded packets as a function of at least one of a header compression threshold, a ciphering threshold, or a vocoder threshold;
means for determining whether the threshold number of discarded packets was reached upon discarding the one or more packets; and
means for proceeding without re-processing respective subsequent packets upon determining that the threshold number of discarded packets was not reached upon discarding the one or more packets.

32. An apparatus, comprising:
means for discarding one or more packets upon expiration of an associated discard timer
means for initializing a count of consecutive discarded packets;
means for incrementing the count of consecutive discarded packets upon discarding one or more packets; and
means for determining whether a threshold number of discarded packets was reached upon discarding the one or more packets, the means for determining comprising means for determining whether the count of consecutive discarded packets exceeds the threshold number of discarded packets and means for resetting the count of consecutive discarded packets upon determining that the count of consecutive discarded packets exceeds the threshold number of discarded packets; and
means for proceeding without re-processing respective subsequent packets upon determining that the threshold number of discarded packets was not reached upon discarding the one or more packets.

33. A computer program product, comprising: a non-transitory computer-readable medium, comprising:
code for causing a computer to discard one or more Packet Data Convergence Protocol (PDCP) Protocol Data Units (PDUs) upon expiration of an associated discard timer;
code for causing a computer to select a threshold number of discarded PDUs based on a number of consecutive PDUs that can be discarded without a loss of synchronization between an associated transmitter Robust Header Compression (RoHC) engine and an intended receiving device;
code for causing a computer to determine whether the threshold number of discarded PDUs was reached upon discarding the one or more PDUs; and
code for causing a computer to proceed without re-processing respective subsequent PDUs upon determining that the threshold number of discarded PDUs was not reached upon discarding the one or more PDUs.

34. The computer program product of claim 33, wherein the non-transitory computer-readable medium further comprises code for causing a computer to perform at least one processing operation on the respective subsequent PDUs upon determining that the threshold number of discarded PDUs was reached, the at least one processing operation comprising one or more of PDCP header reconfiguration, recalculation of ciphering parameters, or re-execution of Robust Header Compression (RoHC).

35. The computer program product of claim 33, wherein the code for causing a computer to select the threshold number of discarded PDUs comprises code for causing a computer to select the threshold number of discarded PDUs based on a header type utilized by respective PDUs designated for transmission.

36. The computer program product of claim 33, wherein the code for causing a computer to select the threshold number of discarded PDUs comprises code for causing a computer to select the threshold number of discarded PDUs based on a desired level of resistance to PDU loss or synchronization loss.

37. A computer program product, comprising:
a non-transitory computer-readable medium, comprising:
code for causing a computer to discard one or more Packet Data Convergence Protocol (PDCP) Protocol Data Units (PDUs) upon expiration of an associated discard timer;
code for causing a computer to select a threshold number of discarded PDUs as a function of a discontinuous transmission (DTX) cycle of an associated vocoder;

code for causing a computer to determine whether the threshold number of discarded PDUs was reached upon discarding the one or more PDUs; and code for causing a computer to proceed without re-processing respective subsequent PDUs upon determining that the threshold number of discarded PDUs was not reached upon discarding the one or more PDUs.

38. A computer program product, comprising:

a non-transitory computer-readable medium, comprising:

code for causing a computer to discard one or more Packet Data Convergence Protocol (PDCP) Protocol Data Units (PDUs) upon expiration of an associated discard timer;

code for causing a computer to select a threshold number of discarded PDUs based on a number of consecutive PDUs that can be discarded without a loss of ciphering synchronization with an intended receiving device;

code for causing a computer to determine whether the threshold number of discarded PDUs was reached upon discarding the one or more PDUs; and code for causing a computer to proceed without re-processing respective subsequent PDUs upon determining that the threshold number of discarded PDUs was not reached upon discarding the one or more PDUs.

39. The computer program product of claim 38, wherein the code for causing a computer to select the threshold number of discarded PDUs comprises code for causing a computer to select the threshold number of discarded PDUs based on a PDCP sequence length utilized for transmission.

40. A computer program product, comprising:

a non-transitory computer-readable medium, comprising:

code for causing a computer to discard one or more Packet Data Convergence Protocol (PDCP) Protocol Data Units (PDUs) upon expiration of an associated discard timer;

code for causing a computer to select a threshold number of discarded PDUs as a function of at least one of a header compression threshold parameter, a ciphering threshold parameter, or a vocoder threshold parameter code for causing a computer to determine whether the threshold number of discarded PDUs was reached upon discarding the one or more PDUs; and code for causing a computer to proceed without re-processing respective subsequent PDUs upon determining that the threshold number of discarded PDUs was not reached upon discarding the one or more PDUs.

41. A computer program product, comprising:

a non-transitory computer-readable medium, comprising:

code for causing a computer to discard one or more Packet Data Convergence Protocol (PDCP) Protocol Data Units (PDUs) upon expiration of an associated discard timer;

code for causing a computer to initialize a count of consecutive discarded PDUs;

code for causing a computer to increment the count of consecutive discarded PDUs upon discarding one or more PDUs; and code for causing a computer to determine whether a threshold number of discarded PDUs was reached upon discarding the one or more PDUs, comprising code for determine whether the count of consecutive discarded PDUs exceeds the threshold number of discarded PDUs and to reset the count of consecutive discarded PDUs upon determining that the count of consecutive discarded PDUs exceeds the threshold number of discarded PDUs; and code for causing a computer to proceed without re-processing respective subsequent PDUs upon determining that the threshold number of discarded PDUs was not reached upon discarding the one or more PDUs.

* * * * *